US012190655B2

(12) United States Patent
Dhoot et al.

(10) Patent No.: US 12,190,655 B2
(45) Date of Patent: Jan. 7, 2025

(54) COLLABORATIVE DATA SHARING FOR DATA ANOMALIES

(71) Applicant: INTERNATIONAL BUSINESS MACHINES CORPORATION, Armonk, NY (US)

(72) Inventors: Akash U. Dhoot, Pune (IN); Sarbajit K. Rakshit, Kolkata (IN); Partho Ghosh, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 318 days.

(21) Appl. No.: 17/652,287

(22) Filed: Feb. 24, 2022

(65) Prior Publication Data

US 2023/0267775 A1    Aug. 24, 2023

(51) Int. Cl.
  *G07C 5/08*  (2006.01)
  *G06N 20/00*  (2019.01)
  *G07C 5/00*  (2006.01)

(52) U.S. Cl.
  CPC .......... *G07C 5/0808* (2013.01); *G06N 20/00* (2019.01); *G07C 5/008* (2013.01); *G07C 5/0816* (2013.01); *G07C 5/0841* (2013.01)

(58) Field of Classification Search
  CPC .... G07C 5/0808; G07C 5/008; G07C 5/0816; G07C 5/0841; G06N 20/00; G06V 10/82; G06V 20/56
  See application file for complete search history.

(56) References Cited

U.S. PATENT DOCUMENTS 9,547,989 B2 *   1/2017  Fairfield ......... G08G 1/096725
10,037,689 B2 *  7/2018  Taylor .................. G05D 1/0285
10,185,999 B1 *  1/2019  Konrardy ............... G06Q 40/08
(Continued)

FOREIGN PATENT DOCUMENTS

CN    110620998 A    12/2019
DE    102018122588 A1    3/2019
(Continued)

OTHER PUBLICATIONS

Giarranta, "Vehicle-To-Vehicle Communication Systems", https://www.trafficsafetystore.com/blog/vehicle-to-vehicle-communication/, Sep. 27, 2021, pp. 1-10.
Mell et al., "The NIST Definition of Cloud Computing", National Institute of Standards and Technology, Special Publication 800-145, Sep. 2011, pp. 1-7.
(Continued)

*Primary Examiner* — Calvin Cheung
(74) *Attorney, Agent, or Firm* — Tihon Poltavets

(57) ABSTRACT

A method for collaborative data sharing for data anomalies includes identifying an anomaly with data for a first system on a first vehicle. In response to determining the data associated with the anomaly is capturable by other vehicles, the method further includes identifying a second vehicle in the vicinity in the first vehicle, wherein the vicinity is defined by an operational distance of the first system on the first vehicle. The method further includes capturing, by a second system on the second vehicle, the data associated with the anomaly. In response to determining captured data by the second system on the second vehicle requires transformation to conform to the first vehicle, the method further includes transforming the captured data by the second system on the second vehicle to conform to the first vehicle.

20 Claims, 6 Drawing Sheets

(56) References Cited

U.S. PATENT DOCUMENTS

| | | | |
|---|---|---|---|
| 10,769,953 | B1 | 9/2020 | Salles |
| 10,798,079 | B2* | 10/2020 | Miramonti ............ H04L 63/061 |
| 11,610,441 | B1* | 3/2023 | Bernico ................. G06Q 40/08 |
| 11,922,740 | B2* | 3/2024 | Edren ................... G07C 5/0816 |
| 2010/0010705 | A1* | 1/2010 | Duddle .................. G07C 5/085 |
| | | | 29/854 |
| 2010/0087984 | A1* | 4/2010 | Joseph ................... G09B 19/16 |
| | | | 701/31.4 |
| 2011/0204898 | A1* | 8/2011 | Kim .................... G01R 31/3842 |
| | | | 324/434 |
| 2020/0226728 | A1* | 7/2020 | Han ......................... G06T 5/92 |
| 2020/0252255 | A1* | 8/2020 | Sorrentino ........... H04B 7/0456 |
| 2021/0092019 | A1* | 3/2021 | Fang .................. H04L 43/0876 |
| 2021/0163021 | A1* | 6/2021 | Frazzoli ................. H04W 4/48 |
| 2021/0323492 | A1* | 10/2021 | Mendes ................. G06Q 50/40 |
| 2021/0385865 | A1* | 12/2021 | Mueck ................. H04W 80/02 |
| 2022/0068122 | A1* | 3/2022 | Ucar ....................... H04W 4/46 |
| 2022/0345980 | A1* | 10/2022 | Kim ..................... H04W 40/02 |

FOREIGN PATENT DOCUMENTS

| | | | | |
|---|---|---|---|---|
| EP | 3246223 | A1 * | 11/2017 | .......... B61L 15/0072 |
| EP | 3708959 | A1 * | 9/2020 | ............. G01C 21/32 |
| WO | 2020133451 | A1 | 7/2020 | |
| WO | 2023/161271 | A1 | 8/2023 | |

OTHER PUBLICATIONS

UC San Diego, "Collaborative Intelligence in Smart and Connected Vehicles", http://esdat.ucsd.edu/index.php/projects/connected-vehicles/collaborative-intelligence-smart-and-connected-vehicles, Jacobs School of Engineering, Sep. 29, 2021, pp. 1-3.

Dhoot et al., "Collaborative Data Sharing for Data Anomalies", International Application No. PCT/EP2023/054409, International Filing Date Feb. 22, 2023, 32 pages.

Erhan et al., "Smart anomaly detection in sensor systems: A multi-perspective review", Information Fusion, vol. 67, Mar. 2021, pp. 64-79.

Banez-Guzman et al., "Vehicle to Vehicle communications applied to Road Intersection Safety, Field Results", 2010 13th International IEEE Annual Conference on Intelligent Transportation Systems, Sep. 19-22, 2010, pp. 192-197.

International Searching Authority, "International Search Report and Written Opinion of the International Searching Authority", International Application No. PCT/EP2023/054409, Mailed May 9, 2023, 10 pages.

Shalom et al., "Generating Photo-realistic Images from LiDAR Point Clouds with Generative Adversarial Networks", arXiv:2112.11245v1 [cs.CV] Dec. 20, 2021, 11 pages.

Wang et al., "V2V Net: Vehicle-to-Vehicle Communication for Joint Perception and Prediction", arXiv:2008.07519v1 [cs.CV] Aug. 17, 2020, 17 pages.

* cited by examiner

COLLABORATIVE DATA SHARING FOR DATA ANOMALIES

BACKGROUND

This disclosure relates generally to data anomalies and in particular to collaborative data sharing for data anomalies produced by various systems on a vehicle.

The utilization of data in the global automotive industry allows for Equipment Manufacturers (OEMs) to analyze and provide improvements to products produced in an accelerated manner. OEMs have also started exploring the ability of vehicle-to-vehicle data sharing to provide awareness between vehicles traveling in a cluster, as a means of providing an additional level of safety to each of the vehicles in the cluster. Each vehicle includes various systems for assisting the driver with safely operating the vehicle. These various systems can include numerous cameras, radars, Light Detection and Ranging (LIDAR), sonar sensors, and ultrasonic sensors.

SUMMARY

Embodiments in accordance with the present invention disclose a method, computer program product and computer system for collaborative data sharing for data anomalies, the method, computer program product and computer system can identify an anomaly with data for a first system on a first vehicle. The method, computer program product and computer system can, responsive to determining the data associated with the anomaly is capturable by other vehicles, identify a second vehicle in the vicinity in the first vehicle, wherein the vicinity is defined by an operational distance of the first system on the first vehicle. The method, computer program product and computer system can capture, by a second system on the second vehicle, the data associated with the anomaly. The method, computer program product and computer system can, responsive to determining captured data by the second system on the second vehicle requires transformation to conform to the first vehicle, transform the captured data by the second system on the second vehicle to conform to the first vehicle.

BRIEF DESCRIPTION OF THE SEVERAL VIEWS OF THE DRAWINGS

Preferred embodiments of the present invention will now be described, by way of example only, and with reference to the following drawings.

DETAILED DESCRIPTION

Embodiments of the present invention provide collaborative data sharing between multiple vehicles located in a vicinity to vehicle with a system producing data anomalies. Embodiments of the present invention identify an anomaly for data being produced by a system on a vehicle in motion, where the system facilitates safe operations of the vehicle in motion. Embodiments of the present invention identify the system producing the data anomaly and determine whether the data associated with the anomaly is capturable by a system on another vehicle. If the data associated with the anomaly is capturable by a system on another vehicle, embodiments of the present invention identify vehicles in a vicinity of the vehicle in motion that include the system capable of capturing the data associated with anomaly. Embodiments of the present invention capture, by the identified vehicles, the data associated with anomaly for the vehicle in motion and determine whether the captured data by the identified vehicles requires transformation to conform to the vehicle in motion. If the captured data by the identified vehicles requires transformation to conform to the vehicle in motion, embodiments of the present invention transform and display the captured data based on a perspective of the vehicle in motion and a location for the vehicle in motion and the identified vehicles. Embodiments of the present invention provide improvements to technology in the area of transportation through vehicle collaboration and the sharing of safety data between vehicles for instance of anomalies in data being produced by at least one safety system on a vehicle taking part in the collaboration. Furthermore, embodiments of the present invention transform the collaborative sharing of the safety data between vehicles based on a perspective of the vehicle with the at least one safety system producing the data anomalies.

Figure 1:
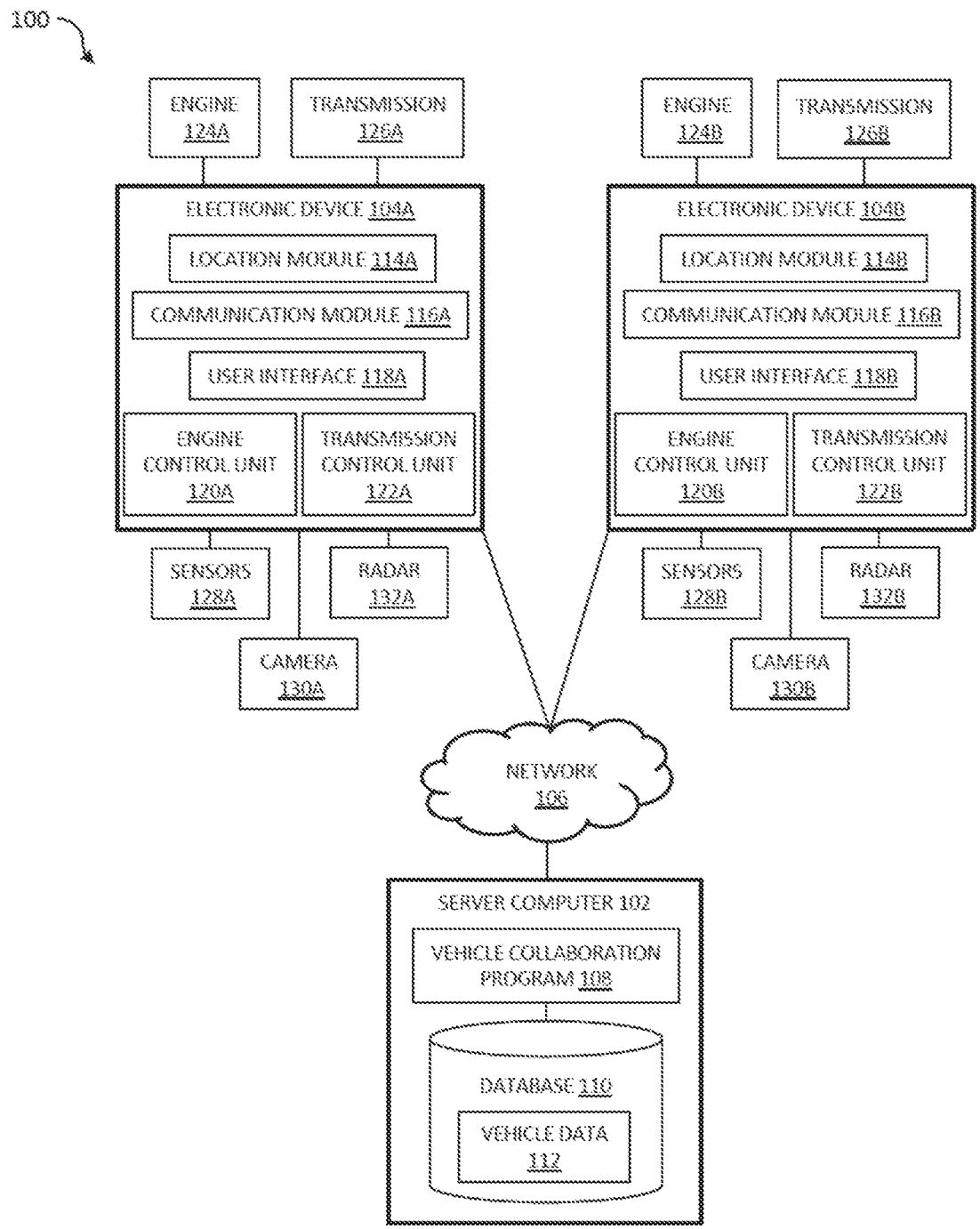
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 102, electronic device 104A, and electronic device 104B, all interconnected over network 106. Server computer 102 can be a standalone computing device, a management server, a web server, a mobile computing device, or any other electronic device or computing system capable of receiving, sending, and processing data. In other embodiments, server computer 102 can represent a server computing system utilizing multiple computers as a server system, such as in a cloud computing environment. In another embodiment, server computer 102 represents a computing system utilizing clustered computers and components (e.g., database server computers, application server computers, etc.) that act as a single pool of seamless resources when accessed within the distributed data processing environment. In this embodiment, server computer 102 has the ability to communicate with other computer devices, such as electronic device 104A and electronic device 106B, to query the computer devices for information. Server computer 102 includes vehicle collaboration program 108, database 110, and vehicle data 112. Server computer 102 may include internal and external hardware components, as depicted and described in further detail with respect to FIG. 4.

Electronic device 104A is associated with a first vehicle and electronic device 104B is associated with a second vehicle. Electronic device 104A and 104B can each be a microprocessor, a microcontroller, or any computing device capable of integrating functions of location module 114A and 114B, communication module 116A and 116B, user interface 118A and 118B, engine control unit (ECU) 120A and 120B, and transmission control unit (TCU) 122A and 122B. Alternatively, a first Controller Area Network (CAN bus) can be utilized to facilitate communications between location module 114A, communication module 116A, user interface 118A, engine control unit (ECU) 120A, and transmission control unit (TCU) 122A, along with sensors 128A, camera 130A, and radar 132A on the first vehicle. A second Controller Area Network (CAN bus) can be utilized to facilitate communications between location module 114B, communication module 116B, user interface 118B, engine control unit (ECU) 120B, and transmission control unit (TCU) 122B, along with sensors 128B, camera 130B, and radar 132B on the second vehicle. User interface 118A and 118B of respective electronic device 104A and 104B allows for a user (i.e., vehicle operator) to interact with and communicate with vehicle collaboration program 108 and any one of the systems associated with electronic device 104A and 104B, mentioned above. In general, electronic device 104A and 104B are representative of any programmable electronic device or combination of programmable electronic devices capable of executing machine-readable program instructions and communicating with users of other electronic devices via network 106. Electronic device 104A and 104B may include components, as depicted and described in further detail with respect to FIG. 4, in accordance with embodiments of the present invention.

In general, network 106 can be any combination of connections and protocols that will support communications between server computer 102 and electronic device 104A and 104B. Network 106 can include, for example, a local area network (LAN), a wide area network (WAN), such as the internet, a cellular network, or any combination of the preceding, and can further include wired, wireless, and/or fiber optic connections. Network 106 can include one or more wired and/or wireless networks capable of receiving and transmitting data, voice, and/or video signals, including multimedia signals that include voice, data, and video information. In one embodiment, vehicle collaboration program 108 can be a web service accessible via network 106 to a user of electronic device 104A and 104B. In general, network 106 can be any combination of connections and protocols that will support communications between server computer 102, electronic device 104A and 104B, and other computing devices (not shown) within the distributed data processing environment.

Vehicle collaboration program 108 allows for collaborative data sharing between electronic device 104A on a first vehicle and electronic device 104B on a second vehicle for data anomalies present on one of the vehicles (e.g., electronic device 104A). Vehicle collaboration program 108 identifies an anomaly with data for the first vehicle in motion, where the vehicle in motion includes electronic device 104A. Vehicle collaboration program 108 identifies a system (e.g., camera 130A) on the first vehicle associated with anomaly and determines whether the data associated with the anomaly is capturable by other vehicles. In the event vehicle collaboration program 108 determines the data associated with the anomaly is not capturable by other vehicles, vehicle collaboration program 108 displays a notification regarding the anomaly in user interface 118A. In the event vehicle collaboration program 108 determines the data associated with the anomaly is capturable by other vehicles, vehicle collaboration program 108 identifies the second vehicle in a vicinity of the first vehicle in motion. Vehicle collaboration program 108 captures the data associated with the anomaly for the first vehicle in motion by the second vehicle and determines whether the captured data by the second vehicle requires transformation. In the event vehicle collaboration program 108 determines the captured by the second vehicle data requires transformation, vehicle collaboration program 108 transforms the captured data according to the identified system on the first vehicle. Vehicle collaboration program 108 displays the transformed captured data in user interface 118A on the first vehicle in motion.

Database 110 is a repository for data (e.g., vehicle data 112) utilized by vehicle collaboration program 108. In the depicted embodiment, database 110 resides on server computer 102. In another embodiment, database 110 may reside on another device (not illustrated in FIG. 1) within the distributed data processing environment provided vehicle collaboration program 108 has access to database 110. Database 110 can be implemented with any type of storage device capable of storing data and configuration files that can be accessed and utilized by vehicle collaboration program 108, such as a database server, a hard disk drive, or a flash memory. In this embodiment, database 110 stores data utilized by vehicle collaboration program 108 that includes vehicle data 112. Vehicle data 112 includes manufacturer information for a vehicle based on a make, model, and/or Vehicle Identification Number (VIN). Vehicle data 112 can further include service interval information (e.g., miles until next service) for one or more components (e.g., brakes) on a vehicle, data collected for a vehicle during a previous inspection (e.g., tire tread depth, remaining brake pad material), and one or more service codes (e.g., low brake pad warning, ABS fault) produced by the vehicle.

The first vehicle associated with electronic device 104A and the second vehicle associated with electronic device 104B can include safety equipment such as, sensors 128A and 128B, camera 130A and 130B, and radar 132A and 132B, respectively. Vehicle collaboration program 108 has the ability to receive and analyze vehicle data 112 to determine whether data associated with an anomaly is capturable by other vehicles. Vehicle data 112 can include information gathered from location module 114A and 114B, communication module 116A and 116B, engine control unit (ECU) 120A and 120B, transmission control unit (TCU) 122A and 122B, sensors 128A and 128B, camera 130A and 130B, and radar 132A and 132B.

Location module 114A and 114B allow for vehicle collaboration program 108 to identify a location of the first vehicle with electronic device 104A and the second vehicle associated with electronic device 104B. In this embodiment, location module 114A and 114B is a Global Positioning System (GPS) that vehicle collaboration program 108 utilizes to monitor a location for the first vehicle and the second vehicle. Communication module 116A and 116B allows for electronic device 104A and 104B to communicate with vehicle collaboration program 108 on server computer 102, via network 106. User interface 118A and 118B enables a user to make requests or issue commands to electronic device 104A and 104B, respectively, and receive information and instructions in response. In one embodiment, user interface 118A and 118B is a voice user interface (VUI) for a user of electronic device 104A and 104B to access via voice commands in natural language. In one embodiment, user interface 118A and 118B may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 118A and 118B enables a user of electronic device 104A and 104B to respectively interact with vehicle collaboration program 108.

Engine control unit (ECU) 120A and 120B, also known as an engine control module (ECM), is an electronic device that controls and monitors various actuators of engine 124A and 124B, respectively. ECU 120A and 120B utilize a software component capable of controlling and monitoring performance output and operation parameters of engine 124A and 124B. Transmission control unit (TCU) 122A and 122B is an electronic device that controls and monitors various parameters of transmission 126A and 126B, respectively. Similar to ECU 120A and 120B, TCU 122A and 122B utilize a software component capable of controlling and monitoring performance output and operational parameters of transmission 126A and 126B, respectively.

Sensors 128A and 128B, camera 130A and 130B, and radar 132A and 132B represent hardware from which vehicle collaboration program 108 receives and analyzes vehicle data 112 to determine whether data associated with an anomaly is capturable by other vehicles. Sensors 128A and 128B can include electromagnetic, ultrasonic, sonar, lidar, laser, and camera detection systems integrated into various driver assistance systems such as parking assist systems, blind spot monitoring, lane keeping system, and rear cross traffic alert systems. Camera 130A and 130B represents a device capable of capturing optical or infrared images or videos. Camera 130A and 130B allow for detection of heat signatures from humans, wildlife, and other vehicles and are beneficial for instances of low visibility (i.e., dense fog, roadside debris). Radar 132A and 132B represent devices capable of detecting objects in a line of sight of radar 132A and 132B and is typically integrated into various driver assistance systems such as, adaptive cruise control.

Figure 2:
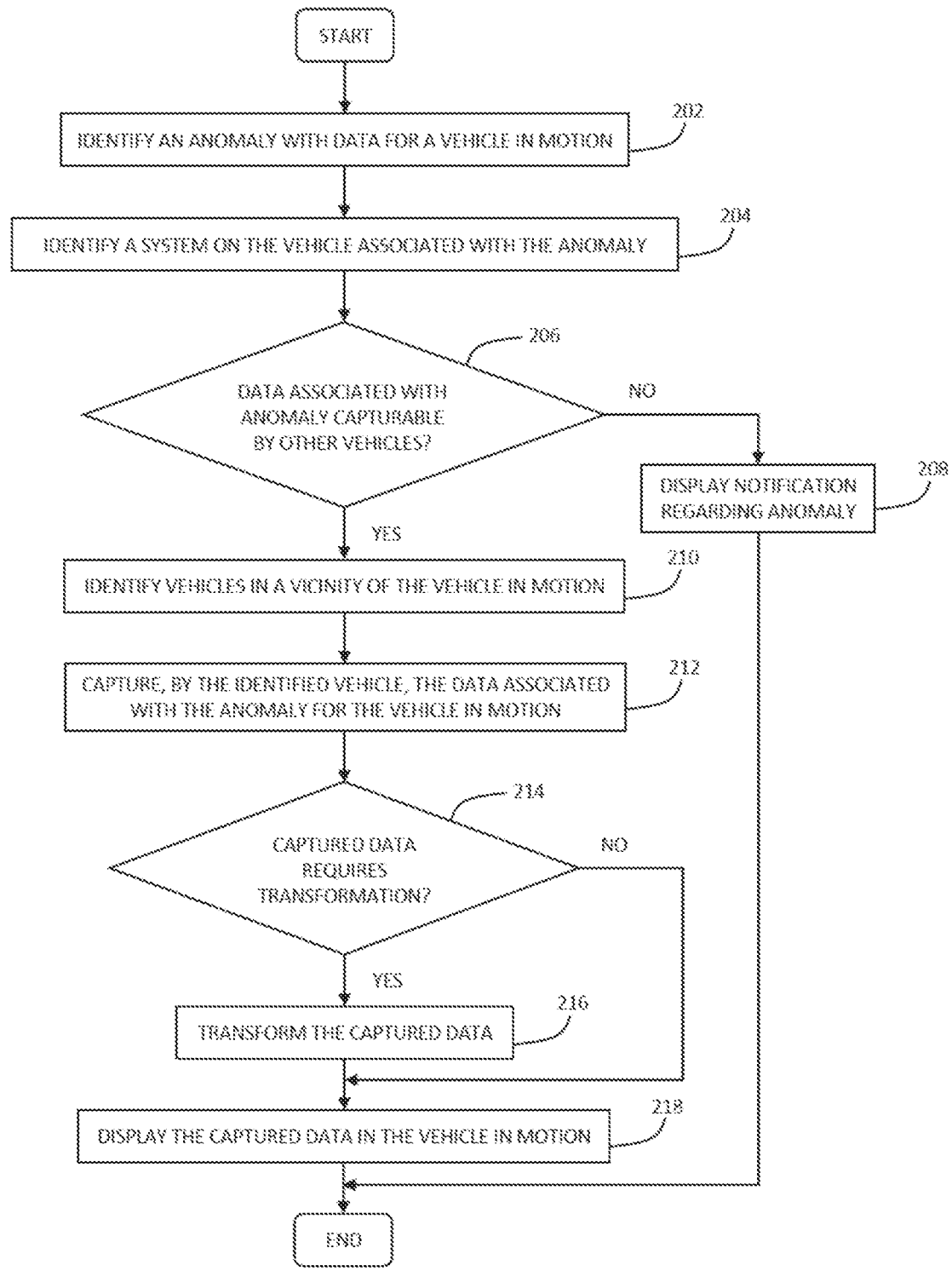
FIG. 2 is a flowchart depicting operational steps of a vehicle collaboration program for collaborative data sharing for data anomalies, in accordance with an embodiment of the present invention.

FIG. 2 is a flowchart depicting operational steps of a vehicle collaboration program for collaborative data sharing for data anomalies, in accordance with an embodiment of the present invention.

Vehicle collaboration program 108 identifies an anomaly with data for a vehicle in motion (202). For discussion purposes, a vehicle in motion represents an internal combustion engine vehicle, electric vehicle, and/or hydrogen powered vehicle that is powered on and configured to travel (e.g., idling, traveling at speed). For the vehicle in motion, vehicle collaboration program 108 receives various data from various systems (e.g., cameras, sensors, and radar) based on a user agreement that a vehicle operator previously agreed to. For example, vehicle collaboration program 108 receives data for multiple cameras on a vehicle, where the data indicates an operational state for each of the multiple cameras. The operational state indicates if each camera is operating properly and producing an image viewable by the vehicle operator. The data vehicle collaboration program 108 receives from each of the multiple cameras does not require the actual images and/or video captured, thus allowing for the preservation of privacy for the vehicle operator. An anomaly with the data represents a change in an operational state of a system on the vehicle indicating a fault with the system that prevents the system from successful performing a task. As the vehicle identifies a fault with a system, vehicle collaboration program 108 receives an alert from the vehicle regarding the fault with the system and identifies the anomaly with the data being produced by a system for a vehicle in motion. An anomaly can also represent an irregularity with the data being produced by a system on the vehicle. The anomaly can include outlier data values, corrupted data values, and/or missing data values. As the vehicle sends data, vehicle collaboration program 108 receives the data for the various systems on the vehicle in motion and identifies any anomalies (e.g., outlier data values), with the data being produced by each of the systems on the vehicle.

In one example, a vehicle in motion includes a rear-facing camera system that produces a video feed in a display on the vehicle, such as a digital display rearview mirror. Vehicle collaboration program 108 receives data from the vehicle regarding the rear-facing camera system that indicates an operational state, where the vehicle identifies a fault with the rear-facing camera system and sends an alert to vehicle collaboration program 108 indicating the operational state of the rear-facing camera system as faulty. Based on the received alert from the vehicle, vehicle collaboration program 108 identifies an anomaly with the data for the vehicle in motion due to the alerting indicating the operational state of the rear-facing camera system as faulty. Alternatively, vehicle collaboration program 108 receives data from the rear-facing camera system on the vehicle in motion and vehicle collaboration program 108 determines the received data includes missing data values. Vehicle collaboration program 108 identifies an anomaly with the data for the vehicle in motion based on the missing data values, where the missing data values indicate a possible intermittent issue with the rear-facing camera system on the vehicle in motion.

In another example, a vehicle in motion includes a blind-spot monitoring system that produces a blind-spot warning to the vehicle operator via a visual indicator. Vehicle collaboration program 108 receives data from the vehicle regarding the blind-spot monitoring system that indicates an operational state for a radar or ultrasonic sensor, where the vehicle identifies a fault with the radar or ultrasonic sensor and sends an alert to vehicle collaboration program 108 indicating the operational state of the blind-spot monitoring system as faulty. Based on the received alert from the vehicle, vehicle collaboration program 108 identifies an anomaly with the data for the vehicle in motion due to the alerting indicating the operational state of the blind-spot monitoring system as faulty. Alternatively, vehicle collaboration program 108 receives data from the rear-facing camera system on the vehicle in motion and vehicle collaboration program 108 determines the received data includes outlier data values. The data outlier values are due to moisture (e.g., snow and iced) buildup in an area where the radar or ultrasonic sensor is positioned on the vehicle. Vehicle collaboration program 108 identifies an anomaly with the data for the vehicle in motion based on the outlier data values, where the outlier data values indicate unreliable data readings for the blind-spot monitoring system on the vehicle in motion.

Vehicle collaboration program 108 identifies a system on the vehicle associated with the anomaly (204). In one embodiment, vehicle collaboration program 108 identifies a system on the vehicle associated with the anomaly by querying the vehicle for various information regarding the system. In another embodiment, vehicle collaboration program 108 identifies a system on the vehicle associated with the anomaly based on metadata for the data associated with the anomaly, where the metadata includes various information regarding the system. The information can include but is not limited to, a type of system, a position, a manufacturer, a part number, and a serial number. A type of system can include a camera, a sensor, and a radar on the vehicle in motion. A position indicates where the system producing the data with the anomaly is located on a vehicle, since the vehicle can include multiple systems for each type of system. For example, a radar or ultrasonic sensor of a blind-spot monitoring system is positioned on both sides of the vehicle and vehicle collaboration program 108 can identify an anomaly with data being produced only by the radar or ultrasonic sensor positioned on the left side of the vehicle (i.e., driver's side). In another example, a vehicle can include multiple cameras in various positions located on the vehicle and vehicle collaboration program 108 can identify an anomaly with data being produced only by a rear-facing camera utilized by a digital display rearview mirror. A manufacturer, part number, and serial number for the identified system on the vehicle associated with the anomaly is utilized by collaboration program 108 to determine whether data captured by another vehicle requires transformation to conform the data with respect to the vehicle in motion. The determination and transformation by vehicle collaboration program 108 is discussed in further detail with regards to (decision 214) and (216) below.

Vehicle collaboration program 108 determines whether the data associated with the anomaly is capturable by other vehicles (decision 206). In the event vehicle collaboration program 108 determines the data associated with the anomaly is not capturable by other vehicles ("no" branch, decision 206), vehicle collaboration program 108 displays a notification regarding anomaly (208). In the event vehicle collaboration program 108 determines the data associated with the anomaly is capturable by other vehicles ("yes" branch, decision 206), vehicle collaboration program 108 identifies vehicles in a vicinity of the vehicle in motion (210).

Vehicle collaboration program 108 determines whether the data associated with the anomaly is capturable by other vehicles based on the identified system on the vehicle associated with the anomaly. As mentioned above, the vehicle in motion can include various systems such as, cameras, sensors, and radars. Though another vehicle can include similar various systems, the data captured by the similar various systems on the other vehicle may not be applicable and/or irrelevant to the operations of the vehicle in motion. Vehicle collaboration program 108 has the ability to determine whether the data associated with the anomaly is capturable and applicable to the vehicle in motion. In an example, a system on the vehicle associated with the anomaly is a rear-facing camera and vehicle collaboration program 108 determines that an image or video of a rear area of the vehicle in motion is capturable by a rear-facing camera on one or more other vehicles. In another example, a system on the vehicle associated with the anomaly is a radar or ultrasonic sensor of a blind-spot monitoring system and vehicle collaboration program 108 determines that data pertaining to a blind-spot of the vehicle in motion is capturable by a radar or ultrasonic sensor of a blind-spot monitoring system on one or more other vehicle and/or by a camera on one or more other vehicles. Though the data that vehicle collaboration program 108 captures with a camera on another vehicle is different than the data captured by a radar or ultrasonic sensor of a blind-spot monitoring system, vehicle collaboration program 108 can transform the data in manner so that the transformed data is applicable to the vehicle in motion. Details regarding this data transformation is discussed in further detail with regards to (216). In yet another example, a system on the vehicle associated with the anomaly is an interior camera capturing eye movements of an operator for the vehicle in motion and vehicle collaboration program 108 determines that the data associated with the anomaly is not capturable by one or more systems on the other vehicles, since no system on another vehicle can capture the eye movements of the operator for the vehicle in motion.

Vehicle collaboration program 108 displays a notification regarding anomaly (208). For instances where vehicle collaboration program 108 determines data associated with the anomaly are not capturable by other vehicles, vehicle collaboration program 108 displays a notification in a user interface (e.g., infotainment system, dashboard) regarding the anomaly. In one embodiment, vehicle collaboration program 108 displays a designated error icon in a dashboard corresponding to a system that produced the data anomaly. In another embodiment, vehicle collaboration program 108 displays an error message identifying the system and the data anomaly produced, along with a caution message to proceed with care until the vehicle is serviced. In yet another embodiment, vehicle collaboration program 108 displays the notification on an electronic device (e.g., digital key, smartphone) utilized the operator of the vehicle as a key, where the notification identifies the system and the data anomaly produced and an operator selectable option to schedule a service to resolve the data anomaly.

Vehicle collaboration program 108 identifies vehicles in a vicinity of the vehicle in motion (210). For the vehicle in motion, vehicle collaboration program 108 continuously identities vehicles in the vicinity as the vehicle in motion drives alongside other vehicles, passes other vehicles, or the other vehicles pass the vehicle in motion. Vehicle collaboration program 108 defines the vicinity based on an operational distance of the system on the vehicle in motion that produced the data associated with the anomaly. The operational distance represents a distance that a system (e.g., camera, sensor, radar) on a vehicle can capture data that is usable by the vehicle in motion. In one example, vehicle collaboration program 108 previously identified an anomaly with data from a rear-facing camera system on a vehicle in motion, where a video of a rear area of the vehicle in motion is not being produced by the rear-facing camera. Vehicle collaboration program 108 determines an operational distance of the rear-facing camera system on the vehicle in motion is 50 feet, thus vehicle collaboration program 108 defines a vicinity as a 50-foot diameter circle surrounding the vehicle in motion. Vehicle collaboration program 108 identifies vehicles located within the 50-foot diameter circle surrounding the vehicle in motion, where each of the identified vehicles includes a system for capturing data associated with the anomaly (i.e., a video of the rear area of the vehicle). In another example, vehicle collaboration program 108 previously identified an anomaly with data from a blind-spot monitoring system on a vehicle in motion, where a radar or ultrasonic sensor produced outlier data value. Vehicle collaboration program 108 determines an operational distance of the blind-spot monitoring system on the vehicle in motion is 75 feet, thus vehicle collaboration program 108 defines a vicinity as a 75-foot diameter circle surrounding the vehicle in motion. Vehicle collaboration program 108 identifies vehicles located within the 75-foot diameter circle surrounding the vehicle in motion, where each of the identified vehicles includes a system for capturing data associated with the anomaly.

Vehicle collaboration program 108 captures, by the identified vehicle, the data associated with the anomaly for the vehicle in motion (212). Prior to capturing, by the identified vehicle, the data associated with the anomaly for the vehicle in motion, vehicle collaboration program 108 allows for an operator of each of the identified vehicles to establish privacy settings for the sharing of data with other vehicles. Vehicle collaboration program 108 allows for an operator of each identified vehicle to select what data from each system on the identified vehicle can be shared with other vehicles. Based on the privacy settings for each of the identified vehicles, vehicle collaboration program 108 captures data associated with the anomaly for the vehicle in motion by one or more systems on the identified vehicles. Vehicle collaboration program 108 can instruct an identified vehicle to transmit the data (e.g., sensor reading, video feed from a camera) and can receive the data from each of the identified vehicles. In one example, vehicle collaboration program 108 captures a video feed from a rear-facing camera on an identified vehicle, where the identified vehicle is traveling alongside the vehicle in motion. The video feed from the rear-facing camera on the identified vehicle represents the data associated with the anomaly, where a rear-facing camera on the vehicle in motion is nonoperational. In another example, vehicle collaboration program 108 captures readings from an ultrasonic sensor from a blind-spot monitoring system on an identified vehicle, where the identified vehicle is traveling in front of the vehicle in motion. The readings from the ultrasonic sensor on the identified vehicle represents the data associated with the anomaly, where a blind-spot monitoring system on the vehicle in motion is producing outlier data values.

Vehicle collaboration program 108 determines whether the captured data requires transformation (decision 214). In the event vehicle collaboration program 108 determines the captured data does not require transformation ("no" branch, decision 214), vehicle collaboration program 108 displays the captured data in the vehicle in motion (218). In the event vehicle collaboration program 108 determines the captured data requires transformation ("yes" branch, decision 214), vehicle collaboration program 108 transforms the captured data (216). Vehicle collaboration program 108 determines whether the data captured by another vehicle requires transformation to conform the data with respect to the vehicle in motion.

In one example, a rear-facing camera system on the identified vehicle produces a video feed absent from the vehicle in motion (i.e., the data anomaly), where the identified vehicle is traveling alongside the vehicle in motion. Vehicle collaboration program 108 determines the rear-facing camera on the identified vehicle includes a wide angles lens with a field of view of 160 degrees and with a reach of 50 feet. Vehicle collaboration program 108 also determines a rear-facing camera perspective from the identified vehicle is different than a rear-facing camera perspective from the vehicle in motion. As a result, vehicle collaboration program 108 determines the video feed from the identified vehicle requires transformation to conform the rear-facing camera perspective from the vehicle in motion. In another example, an ultrasonic sensor for a blind-spot monitoring system on the identified vehicle produces data values (e.g., distance values for objects in a blind-spot) absent from the vehicle in motion, where the identified vehicle is traveling in front of the vehicle in motion. Vehicle collaboration program 108 determines the ultrasonic sensor on the identified vehicle has a reach of 75 feet from a right rear corner of the identified vehicle. Vehicle collaboration program 108 also determines the identified vehicle is traveling 20 feet in front of the vehicle in motion that is 13 feet long. As a result, vehicle collaboration program 108 determines the ultrasonic sensor data values from the identified vehicle require transformation to account for the variation in distance between the right rear corner of the identified vehicle and a right rear corner of the vehicle in motion.

Vehicle collaboration program 108 transforms the captured data (216). As mentioned above, vehicle collaboration program 108 transforms the captured data from the identified vehicle to conform to the vehicle in motion. In one example, vehicle collaboration program 108 determines a rear-facing camera perspective from the identified vehicle is different than a rear-facing camera perspective from the vehicle in motion and determines the video feed from the identified vehicle requires transformation to conform the rear-facing camera perspective from the vehicle in motion. Vehicle collaboration program 108 utilizes generative adversarial network (GAN) class of machine learning to transform a perspective of the video feed from the identified vehicle to an expected perspective of a video feed from the vehicle in motion, based on location information for the identified vehicle and the vehicle in motion. If vehicle collaboration program 108 captures a video feed from multiple identified vehicles in a vicinity of the vehicle in motion, vehicle collaboration program 108 transforms the multiple video feeds into a single video from an expected perspective of a video feed from the vehicle in motion, based on location information for the multiple identified vehicles and the vehicle in motion. In another example, vehicle collaboration program 108 determines ultrasonic sensor data values from an identified vehicle requires transformation to account for a variation in distance between the right rear corner of the identified vehicle and a right rear corner of the vehicle in motion, where the identified vehicle is traveling in front of the vehicle in motion. From a previously mentioned example, vehicle collaboration program 108 determined the ultrasonic sensor on the identified vehicle has a reach of 75 feet from a right rear corner of the identified vehicle and the identified vehicle is traveling 20 feet in front of the vehicle in motion that is 13 feet long. Vehicle collaboration program 108 transforms the data values to account for the 33 feet distance variation between a perspective of the ultrasonic sensor on the identified vehicle and a perspective of the ultrasonic sensor on the vehicle in motion. So, if the ultrasonic sensor on the identified vehicle captures data for an object (e.g., approaching vehicle) located 44 feet away, vehicle collaboration program 108 transforms the captured data to 11 feet to account for the 33-foot distance variation between the perspective of the ultrasonic sensor on the identified vehicle and the perspective of the ultrasonic sensor on the vehicle in motion.

Vehicle collaboration program 108 displays the captured data in the vehicle in motion (218). In one embodiment, vehicle collaboration program 108 displays the captured data in the vehicle in motion in a user interface, such as, an infotainment system, a digital display rear view mirror, dashboard, and/or a designated visual indicator for the system associated with the captured data. In another embodiment, vehicle collaboration program 108 displays the transformed captured data in the vehicle in motion in a user interface, such as, an infotainment system, digital display rear view mirror, dashboard, and/or a designated visual indicator for the system associated with the captured data. In one example, vehicle collaboration program 108 displays a transformed video feed in a digital display rear view mirror in the vehicle in motion from the multiple rear-view facing cameras from the multiple identified vehicles. In another example, vehicle collaboration program 108 displays an alert via a designated visual indicator in the vehicle in motion for an object located in a blind-spot, based on the transformed ultrasonic sensor readings from the identified vehicle.

Figure 3:
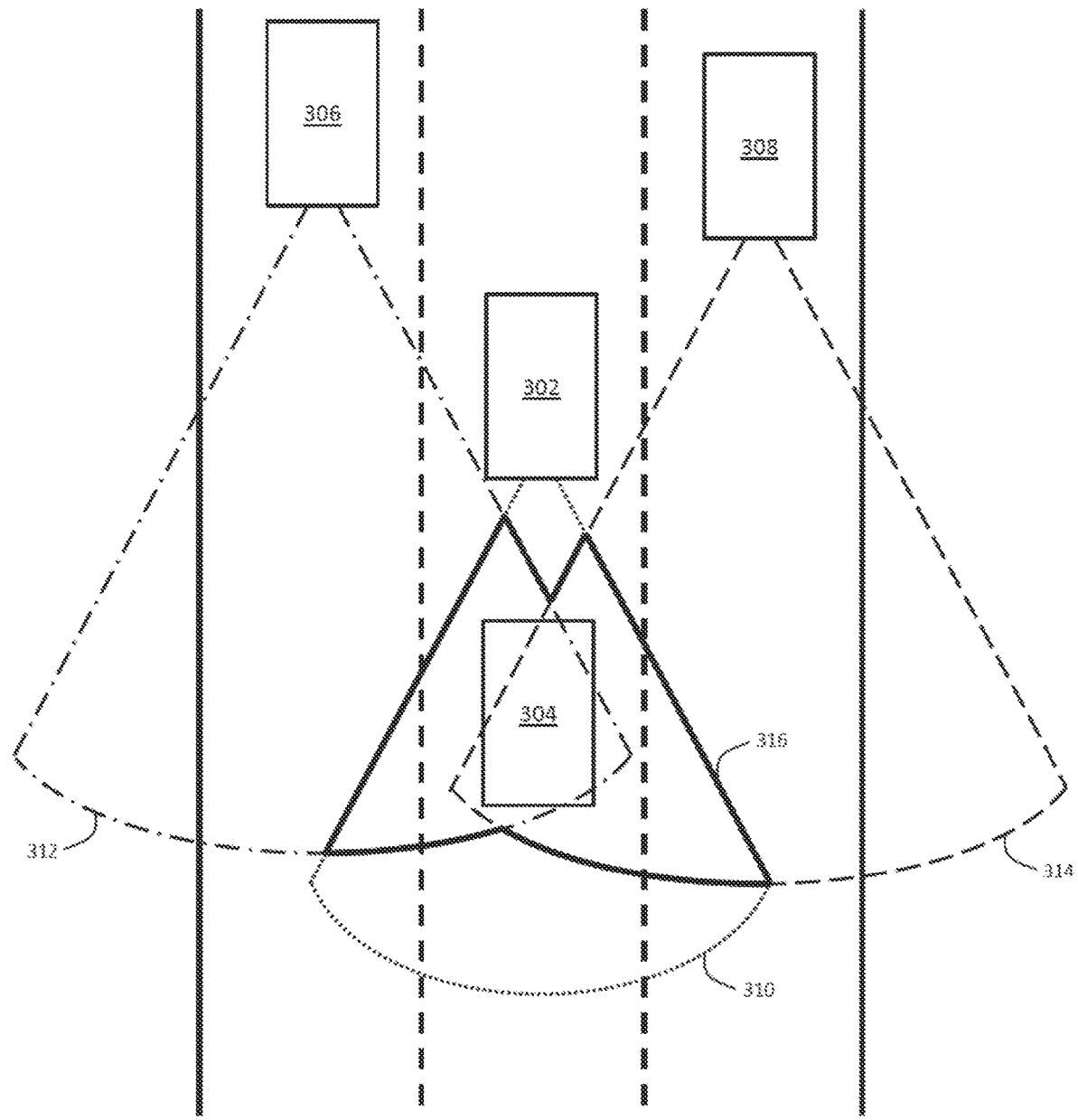
FIG. 3 illustrates an example of collaborative data sharing for a data anomaly on a vehicle in motion, in accordance with an embodiment of the present invention.

FIG. 3 illustrates an example of collaborative data sharing for a data anomaly on a vehicle in motion, in accordance with an embodiment of the present invention. In this example, vehicle in motion 302 is traveling in a middle lane on a highway, where vehicle 304 is positioned behind vehicle in motion 302 in the middle lane, vehicle 306 is positioned to the left of vehicle in motion 302 in the left most lane, and vehicle 308 is positioned to the right of vehicle in motion 302 in the right most lane. Vehicle in motion 302 includes a rear-facing camera system capable of producing a video feed of a rear area and displaying the video to an operator of vehicle in motion 302 in a digital display rear-view mirror. A field of view for the rear-facing camera system on vehicle in motion 302 includes area with perimeter 310, where vehicle 304 is located within the area with perimeter 310. Vehicle collaboration program 108 receives data from vehicle in motion 302 regarding the rear-facing camera system that indicates an operational state, where the vehicle identifies a fault with the rear-facing camera system and sends an alert to vehicle collaboration program 108 indicating the operational state of the rear-facing camera system as faulty. Based on the received alert from the vehicle, vehicle collaboration program 108 identifies an anomaly with the data for the vehicle in motion due to the alerting indicating the operational state of the rear-facing camera system as faulty.

In this example, vehicle collaboration program 108 determines that the video feed of a rear area of the vehicle in motion is capturable by a rear-facing camera on one or more other vehicles and vehicle collaboration program 108 identifies vehicles in a vicinity of vehicle in motion 302. Vehicle collaboration program 108 determines an operational distance of the rear-facing camera system on the vehicle in motion is 75 feet, thus vehicle collaboration program 108 defines a vicinity as a 75-foot radius circle surrounding the vehicle in motion. Vehicle collaboration program 108 identifies vehicle 306 and 308 located within the 75-foot radius circle surrounding the vehicle in motion as being able to capture data associated with the anomaly (i.e., a video of the rear area of the vehicle). Though vehicle 304 is located within the 75-foot radius circle, vehicle collaboration program 108 determines that vehicle 304 does not include a system (e.g., forward facing camera system) capable of capturing data associated with the anomaly. Vehicle collaboration program 108 captures a video feed from a rear-facing camera on vehicle 306 and 308, where a field of view for the rear-facing camera system on vehicle in motion 302 includes area with perimeter 312 and a field of view for the rear-facing camera system on vehicle 308 includes area with perimeter 314. Vehicle collaboration program 108 determines a rear-facing camera perspective from either vehicle 306 or 308 is different than a rear-facing camera system perspective from vehicle in motion 302. As a result, vehicle collaboration program 108 determines the video feed from either vehicle 306 or 308 requires transformation to conform the rear-facing camera perspective from the vehicle in motion.

Vehicle collaboration program 108 utilizes generative adversarial network (GAN) class of machine learning to transform a perspective of the video feed from each of vehicle 306 and 308 to an expected perspective of a video feed from vehicle in motion 302, based on location information for vehicle in motion 302, vehicle 306, and vehicle 308. Vehicle collaboration program 108 transforms the multiple video feeds into a single video from an expected perspective of a video feed from vehicle in motion 302, where a field of view for an expected perspective of the video feed from vehicle in motion 302 is defined by an area with perimeter 316. The area with perimeter 316 includes at least one over lapping field of view capturable by a rear-facing camera system on vehicle 306 or 308. Utilizing generative adversarial network (GAN) class of machine learning, vehicle collaboration program 108 transforms the multiple video feed into a single video feed and displays the video feed in the digital display rear-view mirror in vehicle in motion 302. Vehicle collaboration program 108 allows for an operator of vehicle in motion 302 to maintain awareness of any vehicle located directly behind (i.e., vehicle 304). In addition to displaying the video feed, vehicle collaboration program 108 can include a indicator, such as statement or color border on the video feed, with the video feed to ensure the operator is aware that the image being displaced is sourced from surrounding vehicles (i.e., vehicle 306 and 308).

Figure 4:
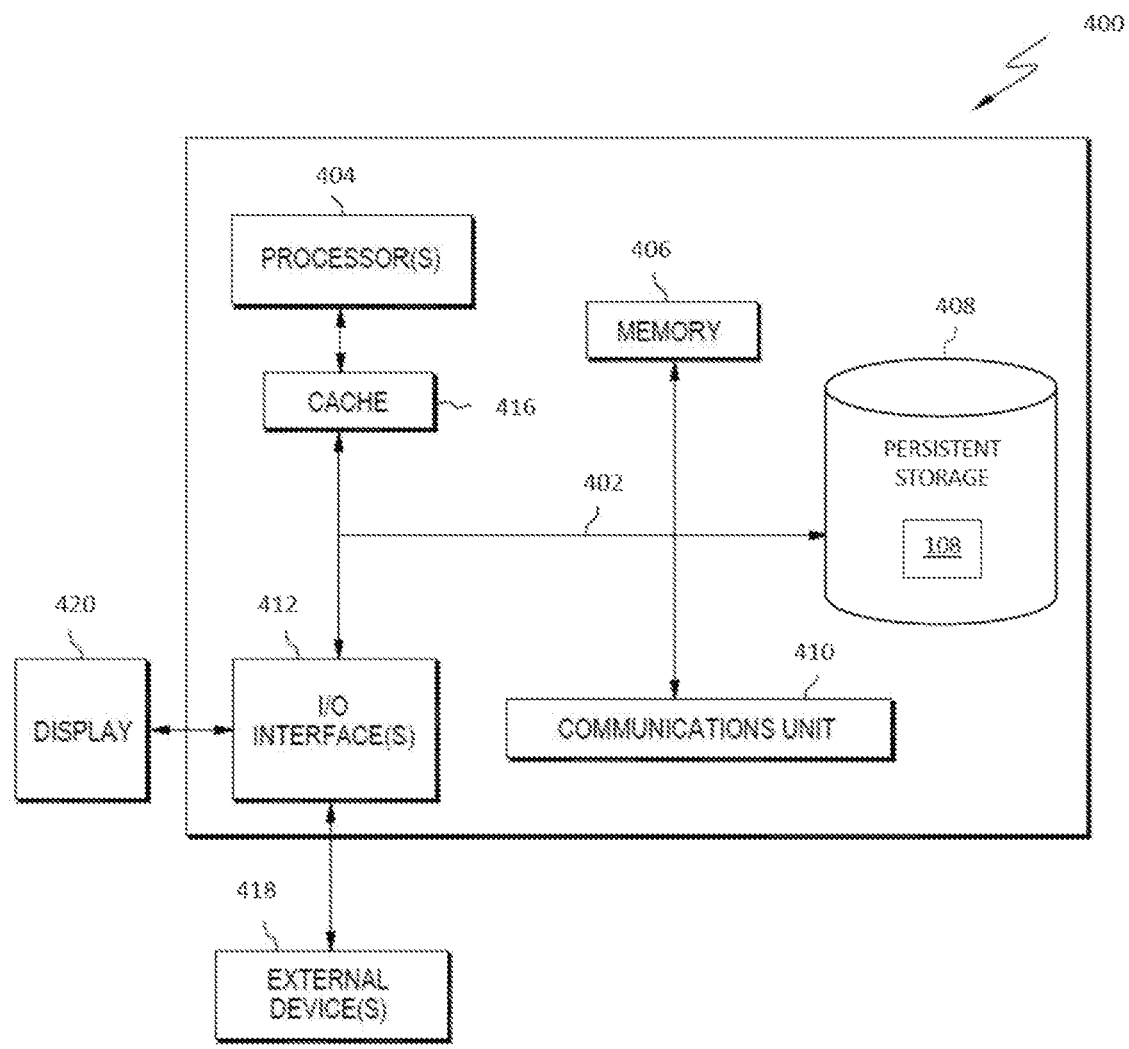
FIG. 4 is a block diagram of components of a computer system, such as the server computer of FIG. 1, in accordance with an embodiment of the present invention.

FIG. 4 depicts computer system 400, where server computer 102 is an example of a computer system 400 that includes Vehicle collaboration program 108 and B, respectively. The computer system includes processors 404, cache 416, memory 406, persistent storage 408, communications unit 410, input/output (I/O) interface(s) 412 and communications fabric 402. Communications fabric 402 provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of processors 404 by holding recently accessed data, and data near recently accessed data, from memory 406.

Program instructions and data used to practice embodiments of the present invention may be stored in persistent storage 408 and in memory 406 for execution by one or more of the respective processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to each computer system. For example, I/O interface 412 may provide a connection to external devices 418 such as a keyboard, a keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
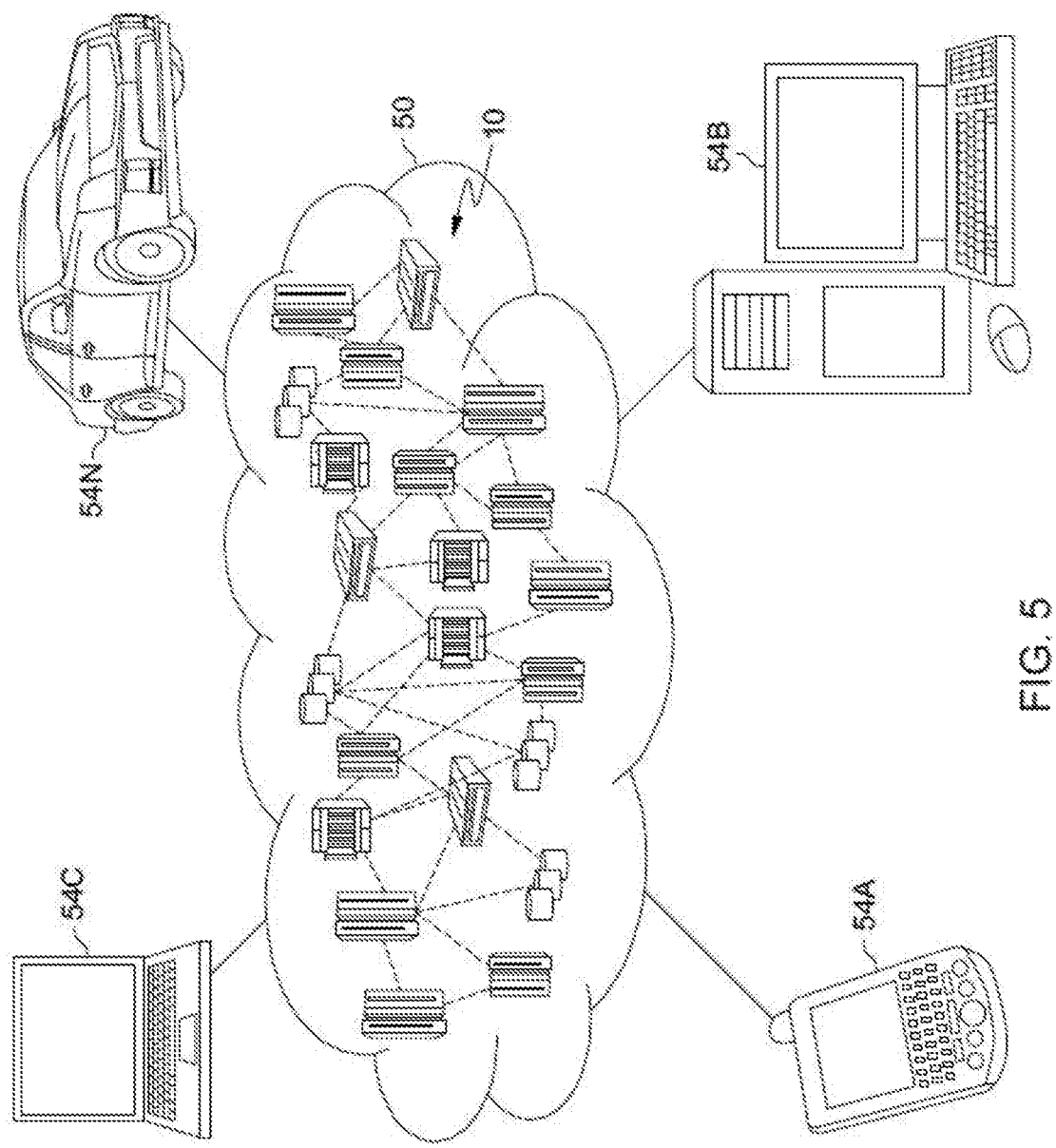
FIG. 5 depicts a cloud computing environment, in accordance with an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
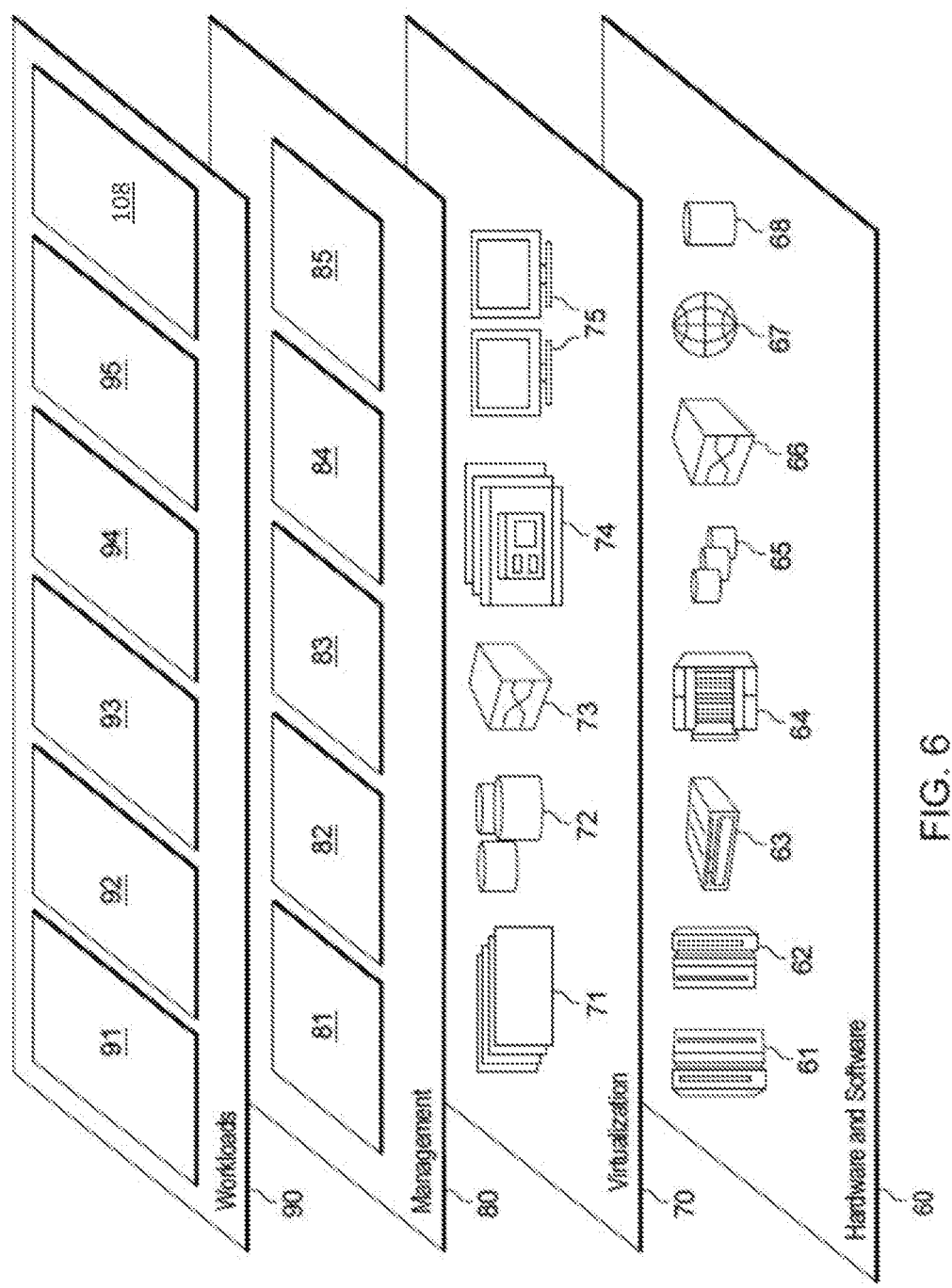
FIG. 6 depicts abstraction model layers, in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and vehicle collaboration program 108.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    identifying an anomaly with data for a first system on a first vehicle;
    determining the data associated with the anomaly is capturable by other vehicles;
    identifying a second vehicle in a vicinity in the first vehicle, wherein the identifying the second vehicle includes:
        determining an operational distance of the first system on the first vehicle;
        identifying, via a first location module on the first vehicle, a location of the first vehicle, wherein the first location module is a first global positioning system (GPS); and
        identifying, via a second location module on the second vehicle, a location of the second vehicle as being located within the operational distance of the first system on the first vehicle, wherein the second location module is a second global positioning system (GPS);
    capturing, by a second system on the second vehicle, the data associated with the anomaly;
    determining captured data by the second system on the second vehicle requires transformation to conform to the first vehicle; and
    transforming the captured data by the second system on the second vehicle to conform to an expected perspective as capturable by the first system on the first vehicle.

2. The computer-implemented method of claim 1, further comprising:
    displaying the transformed captured data in a user interface on the first vehicle, wherein the user interface is selected from the group consisting of: an infotainment system, a digital display rear view mirror, a dashboard, and a designated visual indicator.

3. The computer-implemented method of claim 2, wherein transforming the captured data further comprises:
    determining the perspective for the second system on the second vehicle is different than the expected perspective for the first system on the first vehicle; and
    transforming the perspective for the second system on the second vehicle to the expected perspective for the first system based on the location for the first vehicle and the location for the second vehicle.

4. The computer-implemented method of claim 3, wherein the expected perspective for the first system is for a first camera system on the first vehicle and the perspective for the second system is for a second camera system on the second vehicle.

5. The computer-implemented method of claim 4, wherein transforming the perspective for the second system on the second vehicle to the expected perspective for the first system includes utilizing generative adversarial network (GAN) class of machine learning.

6. The computer-implemented method of claim 3,
    wherein the expected perspective for the first system is for a first ultrasonic sensor on the first vehicle and the perspective for the second system is for a second ultrasonic sensor on the second vehicle, and wherein the transforming the perspective for the second system on the second vehicle to the expected perspective for the first system accounts for a distance variation between the first vehicle and the second vehicle.

7. The computer-implemented method of claim 1, wherein the anomaly is selected from the group consisting of: an outlier data value, a corrupted data value, and a missing data value.

8. A computer program product comprising one or more non-transitory computer readable storage media and program instructions stored on the one or more non-transitory computer readable storage media, to:
   identify an anomaly with data for a first system on a first vehicle;
   determine the data associated with the anomaly is capturable by other vehicles;
   identify a second vehicle in a vicinity in the first vehicle, wherein the identifying the second vehicle includes:
      determine an operational distance of the first system on the first vehicle;
      identify, via a first location module on the first vehicle, a location of the first vehicle, wherein the first location module is a first global positioning system (GPS); and
      identify, via a second location module on the second vehicle, a location of the second vehicle as being located within the operational distance of the first system on the first vehicle, wherein the second location module is a second global positioning system (GPS);
   capture, by a second system on the second vehicle, the data associated with the anomaly;
   determine captured data by the second system on the second vehicle requires transformation to conform to the first vehicle;
   transform the captured data by the second system on the second vehicle to conform to an expected perspective as capturable by the first system on the first vehicle.

9. The computer program product of claim 8, further comprising program instructions, stored on the one or more non-transitory computer readable storage media, to:
   display the transformed captured data in a user interface on the first vehicle, wherein the user interface is selected from the group consisting of: an infotainment system, a digital display rear view mirror, a dashboard, and a designated visual indicator.

10. The computer program product of claim 9, wherein transforming the captured data by the second system on the second vehicle to conform to the first vehicle, further comprises program instructions, stored on the one or more non-transitory computer readable storage media, to:
   determine the perspective for the second system on the second vehicle is different than the expected perspective for the first system on the first vehicle; and
   transform the perspective for the second system on the second vehicle to the expected perspective for the first system based on the location for the first vehicle and the location for the second vehicle.

11. The computer program product of claim 10, wherein the expected perspective for the first system is for a first camera system on the first vehicle and the perspective for the second system is for a second camera system on the second vehicle.

12. The computer program product of claim 11, wherein transforming the perspective for the second system on the second vehicle to the expected perspective for the first system includes utilizing generative adversarial network (GAN) class of machine learning.

13. The computer program product of claim 10, wherein the expected perspective for the first system is for a first ultrasonic sensor on the first vehicle and the perspective for the second system is for a second ultrasonic sensor on the second vehicle, and
wherein the transforming the perspective for the second system on the second vehicle to the expected perspective for the first system accounts for a distance variation between the first vehicle and the second vehicle.

14. The computer program product of claim 8, wherein the anomaly is selected from the group consisting of: an outlier data value, a corrupted data value, and a missing data value.

15. A computer system comprising:
   one or more computer processors;
   one or more computer readable storage media; and
   program instructions stored on the computer readable storage media for execution by at least one of the one or more computer processors, to:
   identify an anomaly with data for a first system on a first vehicle;
   determine the data associated with the anomaly is capturable by other vehicles;
   identify a second vehicle in a vicinity in the first vehicle, wherein the identifying the second vehicle includes:
      determine an operational distance of the first system on the first vehicle;
      identify, via a first location module on the first vehicle, a location of the first vehicle, wherein the first location module is a first global positioning system (GPS); and
      identify, via a second location module on the second vehicle, a location of the second vehicle as being located within the operational distance of the first system on the first vehicle, wherein the second location module is a second global positioning system (GPS);
   capture, by a second system on the second vehicle, the data associated with the anomaly;
   determine captured data by the second system on the second vehicle requires transformation to conform to the first vehicle;
   transform the captured data by the second system on the second vehicle to conform to an expected perspective as capturable by the first system on the first vehicle.

16. The computer system of claim 15, further comprising program instructions, stored on the one or more storage media for execution by at least one of the one or more processors, to:
   display the transformed captured data in a user interface on the first vehicle, wherein the user interface is selected from the group consisting of: an infotainment system, a digital display rear view mirror, a dashboard, and a designated visual indicator.

17. The computer system of claim 16, wherein transforming the captured data by the second system on the second vehicle to conform to the first vehicle, further comprises program instructions, stored on the one or more storage media for execution by at least one of the one or more processors, to:
   determine the perspective for the second system on the second vehicle is different than the expected perspective for the first system on the first vehicle; and
   transform the perspective for the second system on the second vehicle to the expected perspective for the first system based on the location for the first vehicle and the location for the second vehicle.

18. The computer system of claim 17, wherein the expected perspective for the first system is for a first camera system on the first vehicle and the perspective for the second system is for a second camera system on the second vehicle.

19. The computer system of claim 18, wherein transforming the perspective for the second system on the second vehicle to the expected perspective for the first system includes utilizing generative adversarial network (GAN) class of machine learning.

20. The computer system of claim 15, wherein the anomaly is selected from the group consisting of: an outlier data value, a corrupted data value, and a missing data value.

\* \* \* \* \*